United States Patent [19]
Spirk et al.

[11] Patent Number: 5,680,676
[45] Date of Patent: Oct. 28, 1997

[54] KITCHEN UTENSIL HANDLE

[75] Inventors: John W. Spirk, Gates Mills; Rene Polin, Jr., Euclid, both of Ohio

[73] Assignee: G & S Metal Products Co., Inc., Cleveland, Ohio

[21] Appl. No.: 427,153

[22] Filed: Apr. 24, 1995

[51] Int. Cl.[6] .................................................. A47J 45/00
[52] U.S. Cl. ................ 16/110 A; 16/114 A; 16/DIG. 12; D8/107
[58] Field of Search ........................... 16/110 A, 116 R, 16/114 A, 114 R, 111 R, DIG. 12; D8/107, 303, 313, 314, 315, DIG. 6–DIG. 10; D7/393, 395; 30/295

[56] References Cited

U.S. PATENT DOCUMENTS

| | | | |
|---|---|---|---|
| D. 16,786 | 7/1886 | Currier . | |
| D. 51,772 | 2/1918 | Berkshire | 30/295 |
| D. 151,704 | 11/1948 | Oster | D8/DIG. 9 |
| D. 312,749 | 12/1990 | Kessler | D7/395 |
| D. 318,602 | 7/1991 | Vosbikian | D8/10 |
| D. 320,561 | 10/1991 | Glazer | D7/395 |
| D. 329,185 | 9/1992 | Hasegawa | D8/107 |
| 472,006 | 3/1892 | Walker et al. . | |
| 829,353 | 8/1906 | Rand | 30/295 |
| 1,648,354 | 11/1927 | Lied | 16/DIG. 12 |
| 1,754,543 | 4/1930 | Calllum | 30/295 |
| 2,124,615 | 7/1938 | Foltz | 30/340 |
| 2,671,962 | 3/1954 | Spurzem | 30/295 |
| 3,108,316 | 10/1963 | Peale | 16/114 A |
| 3,880,443 | 4/1975 | Tobin | 16/DIG. 12 |
| 4,226,418 | 10/1980 | Balfour | 16/DIG. 12 |
| 4,542,585 | 9/1985 | Ito et al. | 30/210 |
| 4,578,864 | 4/1986 | Hoffman | 30/295 |
| 4,586,256 | 5/1986 | Welmann | 30/162 |
| 4,621,425 | 11/1986 | Stoutenberg | 30/162 |
| 5,251,380 | 10/1993 | Craig | 30/329 |
| 5,373,643 | 12/1994 | Warren | 30/322 |

*Primary Examiner*—Chuck Y. Mah
*Attorney, Agent, or Firm*—Benesch, Friedlander, Coplan & Aronoff LLP

[57] ABSTRACT

A handle for kitchen utensils is disclosed. The handle is designed for ease of grasping and use as well as offering a protective guard to the user. The handle is generally rectangular in shape having an eye at one end to receive the finger of the user and a curved opposing end.

6 Claims, 1 Drawing Sheet

KITCHEN UTENSIL HANDLE

FIELD OF INVENTION

This invention relates to a design for a handle for a kitchen utensil. More particularly, this invention relates to a handle for a kitchen utensil having a design which can be easily grasped by a user of the utensil and which has means for facilitating holding of the utensil by the user and protecting the user's hand from interfering with the utensil when the utensil is in use.

BACKGROUND OF THE INVENTION

Handle designs for kitchen utensils of the prior art come in a variety of shapes and configurations. U.S. Pat. Nos. 4,586,256 and 4,621,425 disclose a utility knife contained in a handle. The handles on these knives are smooth and hard and afford no contouring or surface texture to assist gripping. U.S. Pat. No. 5,251,380 attempts to solve this problem by providing a handle grip for a utility knife having means for retaining the knife in the hand of user when the knife is in use. Further, U.S. Pat. No. 5,373,643 discloses an eating utensil having a looped barrier member into which the fingers may be extending, securing the utensil to the hand of the user. However, these utensil handles do not provide any protection to the hand of the user when the utensil is in use. The user's hand could slip while the utensil is in use and interfere with the use of the utensil resulting in injury to the user's hand.

It is desirable to have a handle for a kitchen utensil which can be easily grasped by a user of the utensil and which has a finger hooking protective guard mean for facilitating holding of the utensil by the user and protecting the user's hand from interfering with the utensil when the utensil is in use.

SUMMARY OF THE INVENTION

In accordance with the present invention, there is provided a handle for a kitchen utensil which can be easily grasped by a user of the utensil and which has a finger retaining protective guard means for facilitating holding of the utensil by the user and protecting the user's hand from interfering with the utensil when the utensil is in use.

Further in accordance with present invention, a handle for a kitchen utensil is provided that may be more easily used and held by individuals suffering from a variety of physical impairments and/or medical conditions, e.g., arthritis, multiple sclerosis and the like.

Still further in accordance with the present invention, a handle for a kitchen utensil is provided that is designed for ease of storage by hanging it on a rack or similar storage unit.

Still further in accordance with the present invention there is provided a handle for a kitchen utensil, the handle comprising:

an elongate sheath with a front end and a back end, a top surface and a bottom surface, and two opposing side surfaces, the side surfaces transitioning from the top surface to the bottom surface;

a finger retaining protective guard for facilitating holding of the kitchen utensil and protecting the user's hand from interfering with the utensil when the utensil is in use, the finger retaining protective guard projecting outwardly from the bottom surface of the handle at the front end of the handle and having an eye for receiving therein any one of the fingers of a hand gasping the handle;

an arcuate projecting flange for facilitating holding of the kitchen utensil projecting outwardly from the bottom surface of the handle at the back end of the handle; and an opening in the front end for receiving an elongate portion of a kitchen utensil.

These and other aspects of the present invention will be apparent to those skilled in the art upon reading and understanding the specification that follows.

DETAILED DESCRIPTION OF THE PREFERRED EMBODIMENTS

Figure 1:
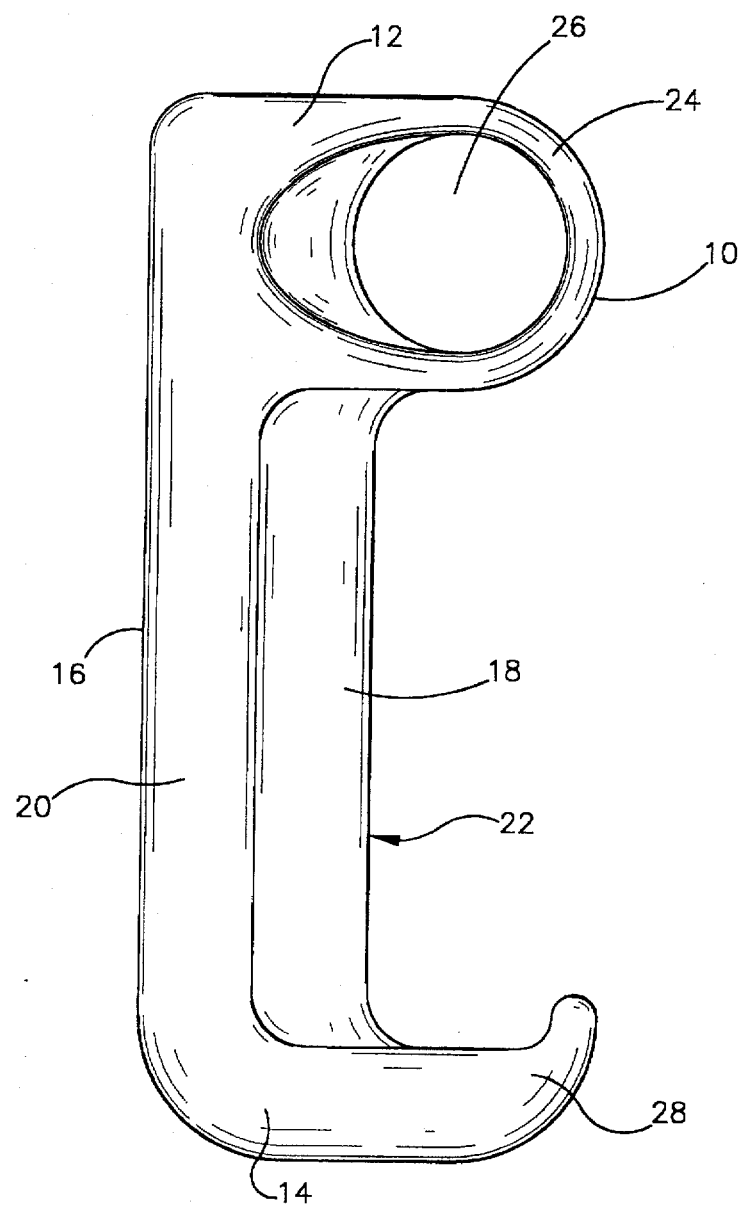
FIG. 1 is a perspective view of a handle for a kitchen utensil according to the present invention.

Referring now to the drawings, wherein the showings are for the purposes of illustrating the preferred embodiments of the invention only and not for the purposes of limiting the scope of the claims, FIG. 1 shows a side perspective view of a handle for a kitchen utensil of the present invention. The handle 10 is an elongated sheath-like apparatus with a front end 12 and a rear end 14. The handle 10 includes an elongated grip portion having a top surface 16 and a generally planar bottom surface 18 which extend between the front and rear ends of the handle. The grip portion further has two opposing side surfaces, 20 and 22, which extend between the top and bottom surfaces. Preferably, the handle is substantially rectangular in shape.

The handle 10 has a finger locking protective guard 24 which projects outwardly from the bottom surface 18 of the handle at the front end 12 of the handle. The finger locking protective guard has an eye 26 for receiving therein any one of the fingers of a hand grasping the handle. The finger locking protective guard facilitates the holding of the kitchen utensil and protecting the user's hand from interfering with the utensil when the utensil is in use. This finger locking protective guard helps to prevent the user's hand from slipping while the utensil is in use and particularly when the user suffers from a physical impairment and/or medical condition. Moreover, the finger locking protective guard aids in preventing from interfering with the use of the utensil which could result in injury to the user's hand.

The handle 10 has generally L-shaped hooked flange 28 which projects outwardly from the bottom surface 18 of the handle at the back end 14 of the handle. The arcuate projecting flange 28 facilitates the holding of the kitchen utensil by the user.

Preferably the portion of the side surfaces between the finger locking protective guard and the arcuate projection flange is tapered in the direction from the top surface to the bottom surface.

Figure 2:
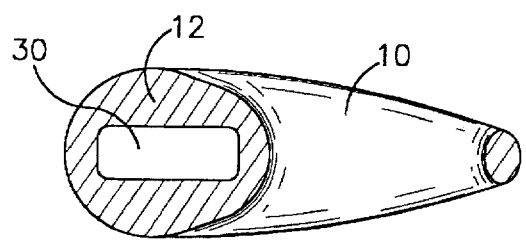
FIG. 2 is a front end view of a handle for a kitchen utensil according to the present invention.

The handle 10 further has an opening 30 in the from end as shown in FIG. 2 of the handle for receiving an elongate portion of the kitchen utensil. The dimension and shape of the opening will vary according the type and size of the kitchen utensil which is to be used in connection with the handle. Preferably, the interior shape of the handle is dimensioned to fit tightly to, and fictionally engage, the kitchen utensil used in connection with the handle. The accurate projecting flange 28 and locking protective guard 24 provides means for suspending and/or hanging the utensil on a rack or other similar unit for each of storage and availability.

The handle may be comprised of any suitable material which is dimensionally stable. Suitable materials include but are not limited to plastic, metal, and wood products, and combinations thereof.

While various embodiments of the handle for a kitchen utensil have been disclosed, it should be understood that modification and adaptions thereof will occur to persons skilled in the art. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

What we claim is:

1. A handle for a kitchen utensil, said handle comprising:

an elongate shear with a front end and a back end, and an elongated grip portion extending between the front end and back end including a top surface and a generally planar bottom surface, and two opposing side surfaces, said side surfaces transitioning from the top surface to the bottom surface;

a finger retaining protective guard for facilitating holding of said kitchen utensil and protecting the hand of a user from interfering with said kitchen utensil when the utensil is in use, said finger retaining protective guard projecting outwardly from the bottom surface of the handle at the front end of said handle and having an opening for receiving therein any one of the fingers of a hand grasping the handle;

a generally L-shaped flange for facilitating holding of said kitchen utensil projecting outwardly from the bottom surface of said handle at the back end of said handle; and a recess in said front end for receiving an elongated portion of a kitchen utensil.

2. The handle of claim 1 wherein said handle is substantially rectangular in shape.

3. The handle of claim 1 wherein the portion of said side surfaces between said finger retaining protective guard and said flange is tapered in the direction from said top surface to said bottom surface.

4. The handle of claim 1 wherein said recess has an interior shape dimensioned to fit tightly to, and frictionally engage said elongate portion of said kitchen utensil.

5. The handle according to claim 1, wherein said finger retaining protective guard and said flange provide surfaces for suspending said handle for easy storage.

6. A handle for a kitchen utensil wherein said handle is substantially rectangular in shape, said handle comprising:

an elongate sheath with a front end and a back end, and an elongated grip portion extending between the front end and back end including a top surface and a generally planar bottom surface, and two opposing side surfaces, said side surfaces transitioning from the top surface to the bottom surface;

a finger retaining means for facilitating holding of said kitchen utensil and protecting the hand of a user from interfering with said kitchen utensil when the utensil is in use, said finger retaining means projecting outwardly from the bottom surface of said handle at the front end of said handle, said finger means having an opening for receiving therein any one of the fingers of a hand grasping said handle;

a generally L-shaped flange for facilitating holding of said kitchen utensil projecting outwardly from the bottom surface of said handle at the back end of said handle;

an opening in said front end for receiving an elongate portion of a kitchen utensil; and wherein the portion of said side surfaces between said finger retaining means and said flange is tapered in the direction from said top surface to said bottom surface and said opening has an interior shape dimensioned to fit tightly to, and frictionally engage said elongate portion of said kitchen utensil.

* * * * *